United States Patent
Jogo et al.

(10) Patent No.: US 10,259,933 B2
(45) Date of Patent: Apr. 16, 2019

(54) THERMOPLASTIC ELASTOMER COMPOSITION

(71) Applicant: KURARAY CO., LTD., Kurashiki-shi (JP)

(72) Inventors: Yosuke Jogo, Kamisu (JP); Masaki Ikuji, Kamisu (JP)

(73) Assignee: KURARAY CO., LTD., Kurashiki-shi (JP)

(*) Notice: Subject to any disclaimer, the term of this patent is extended or adjusted under 35 U.S.C. 154(b) by 86 days.

(21) Appl. No.: 15/505,825

(22) PCT Filed: Aug. 28, 2015

(86) PCT No.: PCT/JP2015/074546
§ 371 (c)(1),
(2) Date: Feb. 22, 2017

(87) PCT Pub. No.: WO2016/031992
PCT Pub. Date: Mar. 3, 2016

(65) Prior Publication Data
US 2017/0275440 A1    Sep. 28, 2017

(30) Foreign Application Priority Data

Aug. 29, 2014 (JP) ................................ 2014-175799

(51) Int. Cl.
| | | |
|---|---|---|
| *C08L 53/02* | (2006.01) | |
| *C08J 3/24* | (2006.01) | |
| *C08L 9/06* | (2006.01) | |
| *C08K 5/01* | (2006.01) | |
| *C08K 5/103* | (2006.01) | |
| *C08K 5/14* | (2006.01) | |
| *C08L 23/00* | (2006.01) | |
| *C08K 5/00* | (2006.01) | |
| *C08L 25/10* | (2006.01) | |
| *C08F 255/02* | (2006.01) | |
| *C08F 287/00* | (2006.01) | |
| *C08F 291/00* | (2006.01) | |
| *C08L 19/00* | (2006.01) | |
| *C08L 91/00* | (2006.01) | |

(52) U.S. Cl.
CPC .............. *C08L 9/06* (2013.01); *C08F 255/02* (2013.01); *C08F 287/00* (2013.01); *C08F 291/00* (2013.01); *C08J 3/24* (2013.01); *C08K 5/0025* (2013.01); *C08K 5/01* (2013.01); *C08K 5/103* (2013.01); *C08K 5/14* (2013.01); *C08L 19/003* (2013.01); *C08L 23/00* (2013.01); *C08L 25/10* (2013.01); *C08L 53/02* (2013.01); *C08L 53/025* (2013.01); *C08L 91/00* (2013.01); *C08L 2207/04* (2013.01)

(58) Field of Classification Search
CPC ........ C08L 53/025; C08L 53/02; C08L 23/10; C08L 23/12; C08L 23/14; C08L 23/142; C08L 23/00; C08L 23/06; C08L 23/08; C08L 23/0807; C08L 23/0815; C08K 5/0025; C08K 5/14
See application file for complete search history.

(56) References Cited

U.S. PATENT DOCUMENTS

| | | |
|---|---|---|
| 2004/0132907 A1 | 7/2004 | Nakamura et al. |
| 2004/0176524 A1* | 9/2004 | Ikuji .................. C08K 5/14 524/505 |
| 2005/0256264 A1 | 11/2005 | Suzuki et al. |

FOREIGN PATENT DOCUMENTS

| | | |
|---|---|---|
| JP | 2003-20383 A | 1/2003 |
| JP | 2003-277575 A | 10/2003 |
| JP | 2004-136594 A | 5/2004 |
| JP | 2004-162049 A | 6/2004 |
| JP | 2005-89656 A | 4/2005 |
| JP | 2006-335901 A | 12/2006 |
| JP | 3946080 B2 | 7/2007 |
| JP | 2008-248148 A | 10/2008 |
| JP | 2010-159363 A | 7/2010 |
| JP | 5085174 B2 | 11/2012 |
| JP | 2005-187536 A | 7/2015 |

OTHER PUBLICATIONS

International Search Report dated Nov. 17, 2015 in PCT/JP2015/074546 filed Aug. 28, 2015.

* cited by examiner

*Primary Examiner* — Jeffrey C Mullis
(74) *Attorney, Agent, or Firm* — Oblon, McClelland, Maier & Neustadt, L.L.P.

(57) ABSTRACT

Provided is a thermoplastic elastomer composition excellent in mechanical characteristics, abrasion resistance, etc., comprising: a crosslinked composition (X) obtained by heat-treating, under molten condition, a composition containing 100 pars of a block copolymer or a hydrogenated product thereof, the block copolymer including a polymer block A mainly derived from an aromatic vinyl compound containing 1% by mass or more of an alkylstyrene and a polymer block B mainly derived from a diene compound, 10 to 300 parts of an olefin-based resin, 0.01 to 20 parts of a crosslinking agent, 1 to 50 parts of a crosslinking adjuvant, and 30 to 250 parts of a softener for rubber; and a hydrogenated block copolymer (Y) obtained by hydrogenating a block copolymer having at least two polymer blocks of an aromatic vinyl compound and at least one polymer block of a conjugated diene compound, with the mass ratio of (X)/(Y) =10/90 to 90/10.

18 Claims, No Drawings

THERMOPLASTIC ELASTOMER COMPOSITION

TECHNICAL FIELD

The present invention relates to a thermoplastic elastomer composition.

BACKGROUND ART

In recent years, thermoplastic elastomers which are a rubber-like soft material not requiring a vulcanization process while having a mold processability similar to a thermoplastic resin have been used in the fields such as automobile parts, consumer electric appliance parts, electric wire coverings, medical care parts, footwear shoes, and sundry goods. Among the thermoplastic elastomers, styrene-based thermoplastic elastomers typically represented by a block copolymer or a hydrogenated product thereof are used as materials having excellent flexibility, mold processability, and so forth wherein the block copolymer or the hydrogenated product thereof has a polymer block including a structural unit derived from an aromatic vinyl compound and a polymer block including a structural unit derived from a conjugated diene compound; however, they are required to have improved abrasion resistance.

Meanwhile, the present applicant previously developed a following composition (1) as a thermoplastic elastomer which is excellent in recovery from distortion at a high temperature (heat resistance), mold processability, rubber characteristics, and flexibility (see PTL 1).
(1) A thermoplastic elastomer composition, wherein the composition is obtained by dynamically crosslinking a mixture under a molten condition thereof, the mixture having the mixing ratio: 100 parts by mass of at least one addition-polymerized block copolymer ($I_0$) selected from the group consisting of a block copolymer and a hydrogenated product thereof, wherein the block copolymer and the hydrogenated product thereof contain one or more polymer block (A) including a structural unit derived from an aromatic vinyl compound and one or more polymer block (B) including a structural unit derived from a conjugated diene compound, and the polymer block (A) contains 1% by mass of a structural unit derived from an alkylstyrene in which at least one alkyl group having 1 to 8 carbon atoms is bonded to a benzene ring thereof; 10 parts by mass to 300 parts by mass of a polyolefin (II); 0 part by mass to 300 parts by mass of a softener for rubber (III); and 0.1 parts by mass to 20 parts by mass of a crosslinking agent (IV); and further the addition-polymerized block copolymer ($I_0$) is crosslinked at least in a portion of the polymer block (A) in the thermoplastic elastomer composition.

And thereafter, the present applicant further developed the following composition (2) as a thermoplastic elastomer composition giving a molded article which is excellent in recovery from distortion at a high temperature (heat resistance), extrusion-mold processability, and surface properties (see PTL 2).
(2) A thermoplastic elastomer composition, wherein the composition is obtained by heat treating a mixture under a molten condition thereof, the mixture including: 100 parts by mass of at least one addition-polymerized block copolymer (I) selected from the group consisting of a block copolymer and a hydrogenated product thereof, wherein the block copolymer and the hydrogenated product thereof contain a polymer block A mainly including a structural unit derived from an aromatic vinyl compound and contains 1% by mass or more of a structural unit (a) derived from an alkylstyrene in which an alkyl group having 1 to 8 carbon atoms is bonded to a benzene ring thereof and a polymer block B mainly including a structural unit derived from a conjugated diene compound; 10 parts by mass to 300 parts by mass of an olefin-based resin (II); 0.01 parts by mass to 20 parts by mass of a crosslinking agent (III); 0.5 parts by mass to 50 parts by mass of a crosslinking adjuvant (IV) having 2 or more methacryloyl group and hydroxyl group; and 30 parts by mass to 250 parts by mass of a softener for rubber (V); and the crosslinking agent (III) is an organic peroxide.

CITATION LIST

Patent Literature

PTL 1: Japanese Patent No. 3946080
PTL 2: Japanese Patent No. 5085174

SUMMARY OF INVENTION

Technical Problem

It is disclosed in PTL 1 and PTL 2 that the thermoplastic elastomer compositions therein are excellent in various physical properties including heat resistance or in various characteristics; however, these compositions do not necessarily have enough abrasion resistance that is required for various uses nor surface smoothness that is influential to an appearance; and thus, it has been proved that they still need some additional improvements.

Accordingly, the problem of the present invention is to provide a thermoplastic elastomer composition which is excellent not only in mechanical characteristics but also in abrasion resistance and surface smoothness.

Solution to Problem

The present invention relates to following [1] to [8].
[1] A thermoplastic elastomer composition, wherein the composition includes a following crosslinked composition (X) and a following hydrogenated block copolymer (Y) with mass ratio of in the range of (X)/(Y)=10/90 to 90/10;
the crosslinked composition (X) being a composition obtained by heat-treating a composition under a molten condition thereof, the said composition including; 100 parts by mass of at least one block copolymer (I) selected from a group consisting of a block copolymer and a hydrogenated product thereof, the said block copolymer including a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly including a structural unit derived from a conjugated diene compound; 10 parts by mass to 300 parts by mass of an olefin-based resin (II); 0.01 parts by mass to 20 parts by mass of a crosslinking agent (III); 1 part by mass to 50 parts by mass of a crosslinking adjuvant (IV); and 30 parts by mass to 250 parts by mass of a softener for rubber (V); and
the hydrogenated block copolymer (Y) being a hydrogenated block copolymer obtained by hydrogenating a block copolymer having at least two polymer blocks C mainly including a structural unit derived from an aromatic vinyl compound and at least one polymer block D mainly including a structural unit derived from a conjugated diene compound, provided that the block copolymer (I) is not included therein.

[2] The thermoplastic elastomer composition according to [1], wherein the polymer block C possessed by the hydrogenated block copolymer (Y) is a polymer block mainly including a structural unit derived from styrene or α-methylstyrene.

[3] The thermoplastic elastomer composition according to [1], wherein the polymer block C possessed by the hydrogenated block copolymer (Y) is a polymer block mainly including a structural unit derived from α-methylstyrene.

[4] The thermoplastic elastomer composition according to any one of [1] to [3], wherein number average molecular weight (Mn) of the hydrogenated block copolymer (Y) is in the range of 30,000 to 300,000.

[5] The thermoplastic elastomer composition according to any one of [1] to [4], wherein the hydrogenated block copolymer (Y) includes:
 (1) the polymer block C having number average molecular weight of in the range of 1,000 to 50,000 and
 (2) the polymer block D having number average molecular weight of in the range of 1,000 to 30,000 and including a polymer block d1 having less than 30 mol % of a 1,4-bonding amount in a structural unit derived from a conjugated diene compound that constitutes the polymer block and a polymer block d2 having number average molecular weight of in the range of 10,000 to 290,000 and 30 mol % or more of a 1,4-bonding amount in a structural unit derived from a conjugated diene compound that constitutes the polymer block.

[6] The thermoplastic elastomer composition according to any one of [1] to [5], wherein the structural unit (a) is a structural unit derived from p-methylstyrene.

[7] The thermoplastic elastomer composition according to any one of [1] to [6], wherein the crosslinking agent (III) is at least one kind selected from organic peroxides.

[8] The thermoplastic elastomer composition according to any one of [1] to [7], wherein the crosslinking adjuvant (IV) is a compound having 2 or more functional groups belonging to at least one kind selected from a group consisting of a methacryloyl group and an acryloyl group.

Advantageous Effects of Invention

According to the present invention, a thermoplastic elastomer composition which is excellent not only in mechanical characteristics but also in abrasion resistance and surface smoothness can be provided.

DESCRIPTION OF EMBODIMENTS

In the following description, the restrictive wording with "being preferable" can be arbitrarily chosen and a combination of restrictive wordings with "being preferable" means being more preferable.

[Thermoplastic Elastomer Composition]

The thermoplastic elastomer composition of the present invention is a thermoplastic elastomer composition including a following crosslinked composition (X) and a following hydrogenated block copolymer (Y) with mass ratio of in the range of (X)/(Y)=10/90 to 90/10;
 the crosslinked composition (X) being a composition obtained by heat-treating a composition under a molten condition thereof, the said composition including; 100 parts by mass of at least one block copolymer (I) selected from a group consisting of a block copolymer and a hydrogenated product thereof, the said block copolymer having a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly including a structural unit derived from a conjugated diene compound; 10 parts by mass to 300 parts by mass of an olefin-based resin (II); 0.01 parts by mass to 20 parts by mass of a crosslinking agent (III); 1 part by mass to 50 parts by mass of a crosslinking adjuvant (IV); and 30 parts by mass to 250 parts by mass of a softener for rubber (V); and
 the hydrogenated block copolymer (Y) being a hydrogenated block copolymer obtained by hydrogenating a block copolymer having at least two polymer blocks C mainly including a structural unit derived from an aromatic vinyl compound and at least one polymer block D mainly including a structural unit derived from a conjugated diene compound, provided that the block copolymer (I) is not included therein.

The mass ratio of the crosslinked composition (X) to the hydrogenated block copolymer (Y), (X)/(Y), is preferably in the range of 20/80 to 90/10, more preferably in the range of 20/80 to 80/20, while still more preferably in the range of 30/70 to 80/20.

In addition, in the thermoplastic elastomer composition, total amount of the crosslinked composition (X) and the hydrogenated block copolymer (Y) is, from viewpoints of mechanical characteristics as well as abrasion resistance and surface smoothness, preferably 50% by mass or more, more preferably 70% by mass or more, more preferably 80% by mass or more, more preferably 90% by mass or more, while still more preferably 95% by mass or more.

Hereinafter, the crosslinked composition (X) will be firstly described.

{Crosslinked Composition (X)}

[(I) Component]

The (I) component is at least one block copolymer selected from a group consisting of a block copolymer and a hydrogenated product thereof, wherein the block copolymer has a polymer block A mainly including a structural unit derived from an aromatic vinyl compound and containing 1% by mass or more of a structural unit (a) derived from a styrene in which an alkyl group having 1 to 8 carbon atoms is bonded to a benzene ring thereof (hereinafter this styrene is sometimes referred to as alkylstyrene) and a polymer block B mainly including a structural unit derived from a conjugated diene compound (hereinafter, this block copolymer is sometimes referred to as simply the block copolymer (I)).

It must be noted here that the phrase "mainly including a structural unit derived from an aromatic vinyl compound" means that 50% by mass or more of the structural unit derived from an aromatic vinyl compound (hereinafter, this structural unit is sometimes referred to as simply the aromatic vinyl compound unit) on the basis of total mass of the polymer block A is contained therein. The content of the structural unit derived from an aromatic vinyl compound in the polymer block A is more preferably 70% by mass or more, still more preferably 90% by mass or more, while particularly preferably 95% by mass or more, each content being on the basis of total mass of the polymer block A.

Also, the phrase "mainly including a structural unit derived from a conjugated diene compound" means that 50% by mass or more of the structural unit derived from a conjugated diene compound (hereinafter, this structural unit is sometimes referred to as simply the conjugated diene compound unit) on the basis of total mass of the polymer block B is contained therein. The content of the structural unit derived from a conjugated diene compound in the polymer block B is more preferably 70% by mass or more, still more preferably 90% by mass or more, while particularly preferably 95% by mass or more, each content being on the basis of total mass of the polymer block B.

Hereinafter, firstly the polymer block A and the polymer block B will be described in detail.

—Polymer Block A—

In the block copolymer (I), the polymer block A corresponds to a hard segment of the thermoplastic elastomer, and the alkyl group which is bonded to a benzene ring in the structural unit (a) reacts with a crosslinking agent so as to play a role to introduce a crosslink to the hard segment including the polymer block A.

Illustrative example of the alkylstyrene giving the structural unit (a) in the polymer block A includes alkylstyrenes whose alkyl group has 1 to 8 carbon atoms such as o-alkylstyrenes, m-alkylstyrenes, p-alkylstyrenes, 2,4-dialkylstyrenes, 3,5-dialkylstyrenes, and 2,4,6-trialkylstyrenes, as well as halogenated alkylstyrenes in which one, or two or more of the hydrogen atoms of the alkyl group of the above-mentioned alkylstyrenes is (or are) substituted with a halogen atom (or hydrogen atoms). More specific example of the alkylstyrene giving the structural unit (a) includes o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene, and p-dichloromethylstyrene.

The polymer block A may have a unit derived from one, or two or more of the alkylstyrene giving the structural unit (a).

If the alkyl group, which is bonded to the benzene ring of the structural unit (a), has 9 or more carbon atoms, the reactivity thereof with the crosslinking agent (III) becomes lower, so that formation of the crosslinking structure becomes difficult. From the same viewpoint, in the alkylstyrene giving the structural unit (a), number of the carbon atoms in the alkyl group which is bonded to the benzene ring is preferably in the range of 1 to 5, more preferably in the range of 1 to 3, while still more preferably 1.

From the viewpoints of availability and reactivity with the crosslinking agent (III), the structural unit (a) is preferably a structural unit derived from a p-alkylstyrene, while the structural unit derived from p-methylstyrene is more preferable.

The block copolymer (I) may have an aromatic vinyl compound unit other than the structural unit (a) as the aromatic vinyl compound unit that constitutes the polymer block A. Illustrative example of the other aromatic vinyl compound unit includes structural units derived from styrene, α-methylstyrene, β-methylstyrene, monofluorostyrene, difluorostyrene, monochlorostyrene, dichlorostyrene, methoxystyrene, vinyl naphthalene, vinyl anthracene, indene, or acetonaphthylene. The other aromatic vinyl compound unit may be one, or two or more kinds. Among them, the structural unit derived from styrene is preferable as the other aromatic vinyl compound unit.

The content ratio of the structural unit (a) in the polymer block A relative to the mass of the polymer block A that constitutes the block copolymer (I) (if the block copolymer (I) has two or more of the polymer block A, total mass of them is used) is 1% by mass or more, more preferably 5% by mass or more, still more preferably 10% by mass or more, while particularly preferably 20% by mass or more. On the other hand, the upper limit value thereof is not particularly restricted; however, the upper limit value is preferably 80% by mass or less, more preferably 60% by mass or less, still more preferably 45% by mass or less, while particularly preferably 40% by mass or less. All the structural units that constitute the polymer block A may be composed of the structural unit (a).

If the content ratio of the structural unit (a) in the polymer block A is less than 1% by mass, sufficient amount of the crosslink cannot be introduced into the polymer block A, so that the thermoplastic elastomer composition to be obtained tends to be poor in the heat resistance.

The bonding form of the structural unit (a) with the aromatic vinyl compound unit other than the structural unit (a) in the polymer block A may be any form selected from a random form, a block form, a tapered form, a tapered block form, and a combination of two or more of these forms.

The polymer block A may have, in addition to the aromatic vinyl compound unit having the structural unit (a), a structural unit derived from other polymerizable compound. In this case, the content ratio of the structural unit derived from the other polymerizable compound is preferably 50% by mass or less, more preferably 30% by mass or less, still more preferably 10% by mass or less, while particularly preferably 5% by mass or less, each content being on the basis of total mass of the polymer block A. In this case, as the examples of the other polymerizable compound, conjugated diene compounds such as butadiene, isoprene, 2,3-dimethyl-1,3-butadiene, 1,3-pentadiene, and 1,3-hexadiene, as well as 1-butene, pentene, hexene, methyl vinyl ether, and the like may be mentioned. The bonding form of these other polymerizable compound may be any form selected from a random form, a block form, a tapered form, a tapered block form, and a combination of two or more of these forms.

The content of the polymer block A in the block copolymer (I) is preferably in the range of 5% by mass to 40% by mass, while more preferably in the range of 15% by mass to 40% by mass. If the content is 5% by mass or more, mechanical characteristics of the thermoplastic elastomer composition become better, and the heat resistance thereof tends to be increased. If the content is 40% by mass or less, the thermoplastic elastomer composition tends to be excellent in flexibility. Meanwhile, the content of the polymer block A in the block copolymer (I) is the value obtained by a $^1$H-NMR spectrum.

—Polymer Block B—

As the example of the conjugated diene compound from which the structural unit that constitutes the polymer block B is derived, isoprene, butadiene, hexadiene, 2,3-dimethyl-1,3-butadiene, 1,3-pentadiene, and the like may be mentioned. The polymer block B may be formed of only one, or two or more of the conjugated diene compounds. Among them, the polymer block B is formed of preferably the structural unit derived from butadiene, isoprene, or a mixture of butadiene and isoprene, while more preferably formed of the structural unit derived from a mixture of butadiene and isoprene.

Meanwhile, there is no particular restriction with regard to the microstructure of the polymer block B (1,2-bond structure, 1,4-bond structure, 3,4-bond structure, and so forth) and the content ratio thereof. Further, in the case that the polymer block B has the structural unit derived from two or more conjugated dienes, their bonding form may be any form selected from a random form, a block form, a tapered form, a tapered block form, and a combination of two or more of these forms.

The polymer block B may contain a small amount of a structural unit derived from a polymerizable compound other than the structural unit derived from the conjugated diene. In this case, the content ratio of the other polymerizable compound is 50% by mass or less, preferably 30% by mass or less, while more preferably 10% by mass or less, each being on the basis of total mass of the polymer block B. Illustrative example of the other polymerizable compound includes styrene, α-methylstyrene, and alkylstyrenes (preferably p-methylstyrene) giving the structural unit (a).

From the viewpoints of weatherability, heat resistance, and the like of the thermoplastic elastomer composition of the present invention, the polymer block B is preferably a polyisoprene block including a structural unit derived from mainly isoprene or a hydrogenated polyisoprene block in which part or all of a carbon-carbon double bond in the polyisoprene block is hydrogenated; a polybutadiene block including a structural unit derived from mainly butadiene or a hydrogenated polybutadiene block in which part or all of a carbon-carbon double bond based on the butadiene unit is hydrogenated; or a copolymer block including a structure derived from a mixture of mainly isoprene and butadiene or a hydrogenated copolymer block in which part or all of a carbon-carbon double bond in the copolymer block is hydrogenated.

In the polyisoprene block capable of becoming a constituting block of the polymer block B, the structural unit derived from isoprene (hereinafter, sometimes this is referred to as simply the isoprene unit) before hydrogenation thereof includes at least one kind selected from the group consisting of a 2-methyl-2-butene-1,4-diyl group [—CH$_2$—C(CH$_3$)=CH—CH$_2$—; 1,4-bonded isoprene unit], an isopropenylethylene group [—CH(C(CH$_3$)=CH$_2$)—CH$_2$—; 3,4-bonded isoprene unit], and a 1-methyl-1-vinylethylene group [—C(CH$_3$)(CH=CH$_2$)—CH$_2$—; 1,2-bonded isoprene unit], wherein the ratio of each unit is not particularly restricted.

In the polybutadiene block capable of becoming a constituting block of the polymer block B, the structural unit derived from butadiene (hereinafter, sometimes this is referred to as simply the butadiene unit) before hydrogenation thereof preferably includes 2-butene-1,4-diyl group (—CH$_2$—CH=CH—CH$_2$—; 1,4-bonded butadiene unit) with the content thereof being in the range of 70 mol % to 20 mol %, especially in the range of 65 mol % to 40 mol %, and a vinyl ethylene group [—CH(CH=CH$_2$)—CH$_2$—; 1,2-bonded butadiene unit] with the content thereof being in the range of 30 mol % to 80 mol %, especially in the range of 35 mol % to 60 mol %. If the content of the 1,4-bond structure unit in the polybutadiene block is in the range of 70 mol % to 20 mol % as mentioned above, the rubber elasticity tends to become better.

In the copolymer block which is capable of becoming a constituting block of the polymer block B and includes the mixture of isoprene and butadiene, before hydrogenation thereof, the isoprene unit includes a 2-methyl-2-butene-1,4-diyl group, an isopropenylethylene group, and 1-methyl-1-vinylethylene group, and the butadiene unit includes a 2-butene-1,4-diyl group and a vinyl ethylene group, wherein the ratio of each unit is not particularly restricted. In the copolymer block including a mixture of isoprene and butadiene, arrangement of the isoprene unit and the butadiene unit may be any form selected from a random form, a block form, a tapered form, a tapered block form, and a combination of two or more of these forms. And in the copolymer block including the mixture of isoprene and butadiene, from viewpoint of rubber elasticity, the mass ratio of the isoprene unit/the butadiene unit is preferably in the range of 10/90 to 90/10, more preferably in the range of 30/70 to 70/30, still more preferably in the range of 35/65 to 65/35, while particularly preferably in the range of 40/60 to 65/35.

From viewpoints of heat resistance and weatherability of the thermoplastic elastomer composition which contains the block copolymer (I), part or all of the carbon-carbon double bond of the polymer block B of the block copolymer (I) is preferably hydrogenated. The hydrogenation rate of the polymer block B in this case is preferably GO mol % or more, more preferably 80 mol % or more, while still more preferably 95 mol % or more. Meanwhile, the hydrogenation rate of the carbon-carbon double bond based on the conjugated diene compound unit of the polymer block B can be calculated from the amounts of the carbon-carbon double bond in the polymer block B before and after the hydrogenation reaction by the $^1$H-NMR measurement. Especially if the hydrogenation rate is near to 100 mol %, at the time when the thermoplastic elastomer composition of the present invention is produced, the reaction ratio of the polymer block B with the crosslinking agent (III) becomes lower, but the reaction of the structural unit (a) of the polymer block A with the crosslinking agent (III) is facilitated, so that the introducing ratio of the crosslink into the polymer block A which constitutes the hard segment becomes higher; and thus, this is preferable.

There is no particular restriction in the method for hydrogenation of the carbon-carbon double bond in the polymer block B, and therefore a known method may be used.

In the block copolymer (I), so far as the polymer block A and the polymer block B are bonded, the bonding style thereof is not restricted; and thus, any bonding style selected from linear bonding, branched bonding, radial bonding, and combination of two or more of them may be allowed. Among them, the bonding style of the polymer block A with the polymer block B is preferably linear bonding, wherein illustrative example thereof includes a triblock copolymer represented by A-B-A, a tetrablock copolymer represented by A-B-A-B, and a pentablock copolymer represented by A-B-A-B-A, provided that the polymer block A is represented by A and the polymer block B is represented by B. Among them, the triblock copolymer (A-B-A) is preferably used from viewpoints of ease of production of the block copolymer (I), flexibility, and the like.

In the block copolymer (I), from viewpoints of mechanical characteristics, mold processability, and the like of the thermoplastic elastomer composition to be obtained, the number average molecular weight of the polymer block A is preferably in the range of 2,500 to 75,000, while more preferably in the range of 5,000 to 50,000; the number average molecular weight of the polymer block B is preferably in the range of 10,000 to 400,000, while more preferably in the range of 30,000 to 350,000; and the number average molecular weight of entirety of the block copolymer (I) is preferably in the range of 12,500 to 2,000,000, more preferably in the range of 50,000 to 1,000,000, still more preferably in the range of 100,000 to 500,000, while particularly preferably in the range of 200,000 to 450,000. Meanwhile, the number average molecular weight (Mn) in this description means the value obtained from a calculation curve of the standard polystyrene by the method of a gel permeation chromatography (GPC).

[(II) Component]

Illustrative example of the olefin-based resin (II) includes an ethylene-based polymer, a propylene-based polymer, poly(1-butene), and poly(4-methyl-1-pentene). These resins may be used singly, or concurrently two or more of them.

It must be noted here that the ethylene-based polymer means a polymer with the content of a structural unit derived from ethylene (hereinafter, this content is sometimes referred to as simply the ethylene content) being 60 mol % or more, wherein the ethylene content is preferably 70 mol % or more, while more preferably 80 mol % or more. Also, the propylene-based polymer means a polymer with the content of a structural unit derived from propylene (hereinafter, this content is sometimes referred to as simply the propylene content) being 60 mol % or more, wherein the propylene content is preferably 70 mol % or more, more preferably 80 mol % or more, while particularly preferably 90 mol % or more.

Specific example of the ethylene-based polymer includes: ethylene homopolymers such as high density polyethylene, medium density polyethylene, and low density polyethylene; ethylene-1-butene copolymer; ethylene-1-hexene copolymer; ethylene-1-heptene copolymer; ethylene-1-octene copolymer; ethylene-4-methyl-1-pentene copolymer; ethylene-vinyl acetate copolymer; ethylene-acrylic acid copolymer; ethylene-acrylate ester copolymer; ethylene-methacrylic acid copolymer; ethylene-methacrylate ester copolymer; and modified products of these polymers.

Specific example of the propylene-based polymer includes: propylene homopolymer, propylene-ethylene random copolymer, propylene-ethylene block copolymer, propylene-1-butene copolymer, propylene-ethylene-1-butene copolymer, propylene-4-methylpentene-1 copolymer, and modified products of these polymers.

Illustrative example of the modified product mentioned above includes a product obtained by graft-copolymerization of the propylene-based resin with a modifying agent and a product obtained by copolymerization of a main chain of the polypropylene-based resin with a modifying agent. Specific example of the modifying agent includes: unsaturated dicarboxylic acids such as maleic acid, citraconic acid, halogenated maleic acid, itaconic acid, cis-4-cyclohexene-1,2-dicarboxylic acid, and endo-cis-bicyclo[2.2.1]-5-heptene-2,3-dicarboxyic acid; esters, amides, or imides of unsaturated dicarboxylic acids; unsaturated dicarboxylic acid anhydrides such as maleic anhydride, citraconic anhydride, halogenated maleic anhydride, itaconic anhydride, cis-4-cyclohexene-1,2-dicarboxylic anhydride, and endo-cis-bicyclo[2.2.1]-5-heptene-2,3-dicarboxyic anhydride; unsaturated monocarboxylic acids such as acrylic acid, methacrylic acid, and crotonic acid; esters of unsaturated monocarboxylic acids (methyl acrylate, ethyl acrylate, methyl methacrylate, ethyl methacrylate, and so forth), and amides or imides of unsaturated monocarboxylic acids. Meanwhile, an unmodified product is preferable as the olefin-based resin (II).

Among them all, from viewpoint of mold processability, the olefin-based resin (II) is preferably ethylene-based polymers such as high density polyethylene, medium density polyethylene, and low density polyethylene; and propylene-based polymers such as propylene homopolymer, ethylene-propylene random copolymer, and ethylene-propylene block copolymer, more preferably propylene-based polymers, while still more preferably propylene homopolymer.

From viewpoints of mold processability and abrasion resistance of the thermoplastic elastomer composition, the melt flow rate (MFR) of the olefin-based resin (II) measured under the conditions of 230° C. and 2.16 kg is preferably 0.1 g/10 min or more, more preferably in the range of 0.1 g/10 min to 50 g/10 min, still more preferably in the range of 0.1 g/10 min to 20 g/10 min, while particularly preferably in the range of 0.1 g/10 min to 10 g/10 min. Meanwhile, the MFR values are obtained by measurement in conformity with JIS K7210.

The content of the olefin-based resin (II) is in the range of 10 parts by mass to 300 parts by mass, preferably in the range of 10 parts by mass to 200 parts by mass, more preferably in the range of 15 parts by mass to 100 parts by mass, more preferably in the range of 20 parts by mass to 60 parts by mass, still more preferably in the range of 20 parts by mass to 40 parts by mass, while particularly preferably in the range of 20 parts by mass to 37 parts by mass, each content being relative to 100 parts by mass of the block copolymer (I). If the content is less than 10 parts by mass relative to 100 parts by mass of the block copolymer (I), mold processability of the thermoplastic elastomer composition to be obtained becomes poor; on the other hand, if the content thereof is more than 300 parts by mass, flexibility and rubber elasticity of the thermoplastic elastomer composition to be obtained becomes lower.

[(III) Component]

With regard to the crosslinking agent (III), a crosslinking agent which can act to the structural unit (a) present in the polymer block A of the block copolymer (I) during the time of producing the thermoplastic elastomer composition of the present invention by the heat treatment under a molten condition thereof so as to be able to form a crosslink in the acted part of the polymer block A may be used. Suitable crosslinking agent can be selected in accordance with the condition of the heat treatment (for example, treatment temperature and treatment time) as well as with considering the reactivity and so forth; and especially, one, or two or more kinds selected from the group consisting of organic peroxides and bismaleimide-based compounds are preferable, while organic peroxides are more preferable.

Illustrative example of the organic peroxide includes: dialkyl monoperoxides such as dicumyl peroxide, di-t-butyl peroxide, t-butyl cumyl peroxide; diperoxides such as 2,5-dimethyl-2,5-di(t-butylperoxy)hexane, 2,5-dimethyl-2,5-di(t-butylperoxy)hexyne-3, 1,3-bis-butylperoxyisopropyl)benzene, 1,1-bis(t-butylperoxy)-3,3,5-trimethylcyclohexane, and n-butyl-4,4-bis(t-butylperoxy)valerate; diacyl peroxides such as benzoyl peroxide, p-chlorobenzoyl peroxide, and 2,4-dichlorobenzoyl peroxide; monoacyl alkyl peroxides such as t-butylperoxy benzoate; percarbonates such as t-butylperoxy isopropyl carbonate; and diacyl peroxides such as diacetyl peroxide and lauroyl peroxide. These may be used singly, or concurrently two or more of them. Among these peroxides, from view point of reactivity, dialkyl monoperoxides such as dicumyl peroxide and diperoxides such as 2,5-dimethyl-2,5-di(t-butylperoxy)hexane are preferable.

With regard to the bismaleimide-based compound, any bismaleimide-based compound may be used so far as the said compound is capable of crosslinking in the alkyl group part bonded to the benzene ring and in the unsaturated double bond part; and therefore, illustrative example thereof includes N,N'-m-phenylene bismaleimide, N,N'-p-phenylene bismaleimide, N,N'-p-phenylene(1-methyl) bismaleimide, N,N'-2,7-naphthene bismaleimide, N,N'-m-naphthene bismaleimide, N,N'-m-phenylene-4-methyl bismaleimide, N,N'-m-phenylene(4-ethyl) bismaleimide, and toluylene bismaleimide. Among these compounds, from viewpoint of reactivity, N,N'-m-phenylene bismaleimide is preferable. These compounds may be used singly, or concurrently two or more of them.

The content of the crosslinking agent (III) is in the range of 0.01 parts by mass to 20 parts by mass, preferably in the range of 0.01 parts by mass to 10 parts by mass, more preferably in the range of 0.1 parts by mass to 10 parts by mass, while particularly preferably in the range of 0.3 parts by mass to 6 parts by mass, each content being relative to 100 parts by mass of the block copolymer (I). If the content is less than 0.01 parts by mass relative to 100 parts by mass of the block copolymer (I), the crosslinking bond cannot be sufficiently formed; on the other hand, if the content is more than 20 parts by mass, there are problems such as bleeding out of the softener for rubber (V) (this will be discussed later) and deterioration of dynamic characteristics of the thermoplastic elastomer composition.

[(IV) Component]

With regard to the crosslinking adjuvant, heretofore known crosslinking adjuvants may be used, wherein illustrative example thereof includes trimethylolpropane trimethacrylate, trimethylolpropane triacrylate, triallyl trimellitate ester, triallyl 1,2,4-benzenetricarboxylate ester, triallyl isocyanurate, 1,6-hexanediol dimethacrylate, 1,9-nonanediol dimethacrylate, 1,10-decanediol dimethacrylate, polyethyleneglycol dimethacrylate, ethyleneglycol dimethacrylate, diethyleneglycol dimethacrylate, triethyleneglycol dimethacrylate, divinyl benzene, glycerol dimethacrylate, and 2-hydroxy-3-acryloyloxypropyl methacrylate.

With regard to the crosslinking adjuvant, a compound having two or more functional groups belonging to at least one kind selected from the group consisting of a methacryloyl group and an acryloyl group is preferable, while a compound having one methacryloyl group, one acryloyl group, and one or more hydroxyl group is more preferable. By using the crosslinking adjuvant like this, effects in improvement of abrasion resistance and mechanical characteristics after crosslinking become eminent. The detailed mechanism of this is not clear; however, this is presumably caused by that use of the crosslinking adjuvant having the specific structure like this increases compatibility of the crosslinking adjuvant thereby leading to the crosslinking structure disposed uniformly. Hereinafter, the crosslinking adjuvant like this will be described in more detail.

Number of the hydroxyl group possessed by the crosslinking adjuvant like this is not particularly restricted so far as the number is one or more; however, the upper limit thereof is preferably 8 or less, more preferably 6 or less, while still more preferably 3 or less. Number of the hydroxyl group possessed by the crosslinking adjuvant like this is particularly preferably 1.

The crosslinking adjuvant like this may further have, besides the methacryloyl group, the acryloyl group, and the hydroxyl group, other functional group such as, for example, one or more kind selected from the group consisting of an amino group, an epoxy group, a fluoro group, a silyl group, and the like.

From viewpoints of mechanical characteristics, abrasion resistance, and heat resistance, the crosslinking adjuvant having, together with one methacryloyl group, one acryloyl group, and one or more hydroxyl group, an alkylene group having 3 to 12 carbon atoms (preferably in the range of 3 to 8, more preferably in the range of 3 to 6, while still more preferably 3) is preferable. From viewpoints of abrasion resistance and heat resistance, the crosslinking adjuvant having an alkylene group having the hydroxyl group between the methacryloyl group and the acryloyl group is preferable.

Meanwhile, both the methacryloyl group and the acryloyl group may be bonded to an oxygen atom, namely, these groups may be a methacryloyloxy group and an acryloyloxy group, respectively.

Among them, from viewpoints of abrasion resistance and heat resistance, 2-hydroxy-3-acryloyloxypropyl methacrylate is preferable as the crosslinking adjuvant (IV).

These crosslinking adjuvants (IV) may be produced, for example, by displacing two of the hydroxyl groups of a trivalent or higher alcohol with one acryloyloxy group and one methacryloyloxy group. With regard to the trivalent or higher alcohol, trivalent or higher alcohols having 3 to 12 carbon atoms (preferably in the range of 3 to 8, more preferably in the range of 3 to 6, while still more preferably 3) may be mentioned, wherein illustrative example thereof includes glycerin (glycerol), trimethylolpropane, pentaerythritol, diglycerin, ditrimethylolpropane, and dipentaerythritol.

The content of the crosslinking adjuvant (IV) is in the range of 1 parts by mass to 50 parts by mass, preferably in the range of 5 parts by mass to 45 parts by mass, more preferably in the range of 10 parts by mass to 40 parts by mass, while still more preferably in the range of 20 parts by mass to 37 parts by mass, each content being relative to 100 parts by mass of the block copolymer (I). If the content is less than 1 part by mass relative to 100 parts by mass of the block copolymer (I), mechanical characteristics, abrasion resistance, and heat resistance of the thermoplastic elastomer composition to be obtained become poor; on the other hand, if the content is more than 50 parts by mass, flexibility of the thermoplastic elastomer composition to be obtained becomes insufficient.

[(V) Component]

Illustrative example of the softener for rubber (V) includes oil-based process oils such as a paraffin-based process oil and a naphthene-based process oil; aromatic-based process oils; silicone oil; vegetable oil-based softeners such as peanut oil and rosin; and synthetic softeners such as ethylene-α-olefin oligomer, liquid polybutene, and low molecular weight polybutadiene.

With regard to the softener for rubber (V), especially a softener having dynamic viscosity at 40° C. in the range of 20 mm$^2$/s to 800 mm$^2$/s is preferable (preferably in the range of 40 mm$^2$/s to 600 mm$^2$/s, while still more preferably in the range of 60 mm$^2$/s to 500 mm$^2$/s). Meanwhile, the dynamic viscosity values are obtained by measurement in conformity with JIS K2283.

With regard to the softener for rubber (V), an oil-based process oil is preferable, while a paraffin-based process oil is more preferable.

The softener for rubber (V) may be used singly, or concurrently two or more of the softeners.

With regard to the softener for rubber (V), such as, for example, paraffin-based process oils and naphthene-based process oils (preferably paraffin-based process oils) in the series of "Diana Process Oil" (trade name, marketed by Idemitsu Kosan Co., Ltd.) may be used.

The content of the softener for rubber (V) is in the range of 30 parts by mass to 250 parts by mass, preferably in the range of 50 parts by mass to 200 parts by mass, more preferably in the range of 50 parts by mass to 140 parts by mass, while still more preferably in the range of 50 parts by mass to 130 parts by mass, each content being relative to 100 parts by mass of the block copolymer (I). If the content is more than 250 parts by mass relative to 100 parts by mass of the block copolymer (I), not only the mechanical characteristics of the thermoplastic elastomer composition of the present invention decreases, but also the softener for rubber (V) tends to readily bleed out from a molded article obtained from the thermoplastic elastomer composition. On the other hand, if the content is less than 30 parts by mass, flexibility of the thermoplastic elastomer composition becomes insufficient.

[Other Components]

The crosslinked composition (X) to be used in the present invention can be obtained by heat-treatment of a composition containing each of the components with the respective above-mentioned amounts under a molten condition thereof, wherein the composition before the heat treatment may contain other polymer so far as the effects of the present invention are not impaired. Illustrative example of the other polymer includes polyphenylene ether-based resins; polyamide-based resins such as polyamide 6, polyamide 6.6, polyamide 6.10, polyamide 11, polyamide 12, polyamide 6.12, polyhexamethylenediamine terephthalamide, polyhexamethylenediamine isophthalamide, and xylene group-containing polyamide; polyester-based resins such as polyethylene terephthalate and polybutylene terephthalate; acryl-based resins such as poly(methyl acrylate) and poly(methyl meth acrylate); polyoxymethylene-based resins such as polyoxymethylene homopolymer and polyoxymethylene copolymer; styrene-based resins such as styrene homopolymer, α-methylstyrene homopolymer, acrylonitrile-styrene resin, and acrylonitrile-butadiene-styrene resin; polycarbonate resins; ethylene-propylene copolymer rubber (EPM) and ethylene-propylene-non-conjugated diene copolymer rubber (EPDM); styrene-butadiene copolymer rubber, styrene-isoprene copolymer rubber, or hydrogenated products or modified products of them; natural rubber; synthetic isoprene rubber, liquid polyisoprene rubber, or hydrogenated products or modified products of them; chloroprene rubber; acryl rubber; butyl rubber, acrylonitrile-butadiene rubber, epichlorohydrin rubber; silicone rubber; fluorine-containing rubber; chlorosulfonated polyethylene; urethane rubber; polyurethane-based elastomer; polyamide-based elastomer; styrene-based elastomer; polyester-based elastomer, and soft vinyl chloride resin. These may be used singly, or concurrently two or more of them.

In the case that the composition before the heat treatment contains these other polymers, the content thereof (if two or more polymers are contained, total content of them) is within the range not impairing mechanical characteristics of the thermoplastic elastomer composition to be obtained, i.e., for example, preferably 200 pasts by mass or less, more preferably 100 parts by mass or less, more preferably 50 parts by mass or less, still more preferably 20 parts by mass or less, while particularly preferably 10 parts by mass or less, each content being relative to 100 parts by mass of the block copolymer (I).

However, even with the condition mentioned above, in the present invention, it is preferable not to contain a hydrogenated block copolymer (Y) (this will be described later) in the composition before the heat treatment. Even if the hydrogenated block copolymer (Y) is contained in the composition before the heat treatment, the content thereof is preferably to a degree not to drastically impair the effects of the present invention; and thus, for example, the content thereof is preferably 50 parts by mass or less, more preferably 30 parts by mass or less, more preferably 15 parts by mass or less, still more preferably 10 parts by mass or less, while particularly preferably 5 parts by mass or less, each content being relative to 100 parts by mass of the block copolymer (I). The most preferable is not to contain the hydrogenated block copolymer (Y) substantially.

Further, the composition before the heat treatment may contain inorganic filler if necessary. Illustrative example of the inorganic filler includes calcium carbonate, talc, clay, synthetic silicon, titanium oxide, carbon black, barium sulfate, mica, glass fiber, whisker, carbon fiber, magnesium carbonate, glass powder, metal powder, kaolin, graphite, molybdenum disulfide, and zinc oxide, wherein one, or two or more of them may be contained in the composition. If the composition before the heat treatment contains inorganic filler, the content thereof is within the range not impairing the effects of the present invention, i.e., for example, preferably 50 parts by mass or less, more preferably 20 parts by mass or less, while still more preferably 10 parts by mass or less, each content being relative to 100 parts by mass of the thermoplastic elastomer composition.

Further, the composition before the heat treatment may contain, if necessary, one or more materials selected from the group consisting of flame retardant, lubricant, light stabilizer, pigment, heat stabilizer, anti-clouding agent, anti-static agent, anti-blocking agent, UV absorber, heat resistant stabilizer, antioxidant, coloring agent, and so forth. Among them, illustrative example of the antioxidant includes hindered phenol-based antioxidants, hindered amine-based antioxidants, phosphorous-based antioxidants, and sulfur-based antioxidants.

(Production Method of the Crosslinked Composition (X))

The crosslinked composition (X) to be used in the present invention is the composition which is obtained by heat treatment of the composition containing each of the components with the respective above-mentioned amounts under a molten condition thereof so as to crosslink at least part of the polymer block A. From a viewpoint in order to dynamically crosslink the composition, the heat treatment is preferably carried out with stirring or mixing the composition containing each of the components with the respective above-mentioned amounts.

With regard to the apparatus to carry out the heat treatment of the composition under a molten condition thereof, any melt kneading apparatus that can uniformly mix respective components may be used. Illustrative example of the apparatus like this includes melt kneaders such as a single screw extruder, a twin screw extruder, a Banbury mixer, a heat roll, and various kneaders. Among them, a twin screw extruder is preferable from viewpoint that the shear force during kneading is large so that dispersion can be made finely and uniformly, and also continuous operation is possible.

In the case that the thermoplastic elastomer composition of the present invention is produced by using a single screw extruder or a twin screw extruder, one extruder may be used, or alternatively, in order to disperse respective components more effectively, heat treatment (preferably melt kneading) may be successively carried out in stages by using two or more extruders.

Temperature of the heat treatment may be arbitrarily selected in the temperature range at which the olefin-based resin (II) is melted and the reaction of the block copolymer (I) with the crosslinking agent (III) can take place. Accordingly, generally the temperature is preferably in the range of 140° C. to 270° C., more preferably in the range of 160° C. to 240° C., while still more preferably in the range of 170° C. to 240° C. The heat treatment time is preferably in the range of 30 seconds to 5 minutes, while more preferably in the range of 45 seconds to 3 minutes.

In the crosslinked composition (X) thus obtained, the melt flow rate (MFR) measured under the conditions of 230° C. and 10 kg falls preferably in the range of 0.5 g/10 min to 35 g/10 min, more preferably 0.5 g/10 min to 20 g/10 min, still more preferably 0.5 g/10 min to 10 g/10 min, while particularly preferably in the range of 0.5 g/10 min to 7 g/10 min. The MFR is the value measured by the method described in EXAMPLES.

Next, explanation will be given to the hydrogenated block copolymer (Y).

{Hydrogenated Block Copolymer (Y)}

The hydrogenated block copolymer (Y) is the hydrogenated block copolymer which is obtained by hydrogenating a block copolymer having at least two polymer blocks C mainly including a structural unit derived from an aromatic vinyl compound and at least one polymer block D mainly including a structural unit derived from a conjugated diene compound. However, the block copolymer (I) is not included in the hydrogenated block copolymer (Y).

It must be noted here that the phrase "mainly including a structural unit derived from an aromatic vinyl compound" means that on the basis of total mass of the polymer block C, 50% by mass or more of the structural unit derived from an aromatic vinyl compound (hereinafter, this structural unit is sometimes referred to as simply the aromatic vinyl compound unit) is contained therein. The content of the structural unit derived from an aromatic vinyl compound in the polymer block C is more preferably 70% by mass or more, still more preferably 90% by mass or more, while particularly preferably 95% by mass or more, each content being on the basis of total mass of the polymer block C.

Also, the phrase "mainly including a structural unit derived from a conjugated diene compound" means that on the basis of total mass of the polymer block D, 50% by mass or more of the structural unit derived from a conjugated diene compound (hereinafter, this structural unit is sometimes referred to as simply the conjugated diene compound unit) is contained therein. The content of the structural unit derived from a conjugated diene compound in the polymer block D is more preferably 70% by mass or more, still more preferably 90% by mass or more, while particularly preferably 95% by mass or more, each content being on the basis of total mass of the polymer block D.

Hereinafter, detailed explanation will be given to the polymer block C and to the polymer block D.

—Polymer Block C—

The polymer blocks C in the hydrogenated block copolymer (Y) includes mainly a structural unit derived from an aromatic vinyl compound.

Illustrative example of the aromatic vinyl compound includes styrene, o-methylstyrene, m-methylstyrene, p-methylstyrene, α-methylstyrene, β-methylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-methoxystyrene, m-methoxystyrene, p-methoxystyrene, styrene substituted with a silyl group, indene, vinyl naphthalene, and vinyl anthracene. One, or two or more aromatic vinyl compounds selected from the above-mentioned compounds may be used.

Among these compounds, especially from viewpoints of abrasion resistance and surface smoothness, the aromatic vinyl compound is preferably styrene, α-methylstyrene, or a mixture of them, more preferably styrene or α-methylstyrene, while still more preferably α-methylstyrene.

However, the polymer block C may contain 10% by mass or less of an unsaturated compound other than the aromatic vinyl compound so far as the purpose and effects of the present invention are not impaired. The other unsaturated compound is at least one compound selected from, for example, butadiene, isoprene, 2,3-dimethyl-1,3-butadiene, 1,3-pentadiene, 1,3-hexadiene, isobutylene, methyl methacrylate, methyl vinyl ether, N-vinyl carbazole, β-pinene, 8,9-p-menthene, dipentene, methylene norbornene, 2-methylene tetrahydrofuran, and the like. The bonding form when the polymer block C contains a structural unit derived from these other unsaturated compounds may be any form selected from a random form, a block form, a tapered form, a tapered block form, and a combination of two or more of these forms.

The number average molecular weight of the polymer block C in the hydrogenated block copolymer (Y) is preferably in the range of 1,000 to 50,000, while more preferably in the range of 2,000 to 40,000.

The content of the polymer block C in the hydrogenated block copolymer (Y) is, from viewpoints of rubber elasticity, flexibility, abrasion resistance, and surface smoothness, preferably in the range of 5% by mass to 45% by mass, while more preferably in the range of 15% by mass to 40% by mass. Meanwhile, the content of the polymer block C in the hydrogenated block copolymer (Y) is the value obtained by a $^1$H-NMR spectrum.

—Polymer Block D—

The polymer blocks D in the hydrogenated block copolymer (Y) includes mainly a structural unit derived from a conjugated diene compound.

Illustrative example of the conjugated diene compound includes at least one compound selected from butadiene, isoprene, 2,3-dimethyl-1,3-butadiene, 1,3-pentadiene, 1,3-hexadiene, and the like. Among these compounds, butadiene, isoprene, and a mixture of butadiene and isoprene are preferable, while butadiene is more preferable.

There is no particular restriction with regard to the microstructure of the structural unit derived from a conjugated diene monomer. For example, in the case that the polymer block D includes mainly the structural unit derived from the butadiene monomer, the content of the 1,4-bond structural unit thereof (hereinafter, this content is simply referred to as 1,4-bonding amount) is preferably in the range of 10 mol % to 95 mol %, more preferably in the range of 30 mol % to 80 mol %, while still more preferably in the range of 45 mol % to 65 mol %. On the other hand, in the case that the polymer block D includes mainly the structural unit derived from isoprene or from a mixture of butadiene and isoprene, the 1,4-bonding amount thereof is preferably in the range of 5 mol % to 99 mol %, more preferably in the range of 30 mol % to 97 mol %, still more preferably in the range of 50 mol % to 97 mol %, particularly preferably in the range of 80 mol % to 97 mol %, while the most preferably 90 mol % to 97 mol %.

Further, in the case that the polymer block D is composed of a structural unit derived from two or more conjugated diene compounds (for example, butadiene and isoprene), there is no particular restriction with regard to the bonding form thereof; and thus, the bonding form may be a random form, a tapered form, a complete alternate form, a partial block form, a block form, or a combination of two or more of these forms.

Meanwhile, at least part of the carbon-carbon double bond in the structural unit derived from the conjugated diene compound is added with hydrogen (hereinafter, this addition of hydrogen is sometimes referred to as hydrogenation); and from viewpoints of heat resistance, weatherability, abrasion resistance, and surface smoothness, the carbon-carbon double bond in the conjugated diene compound unit is hydrogenated preferably 50 mol % or more, more preferably 70 mol % or more, still more preferably 90 mol % or more, while particularly preferably 95 mol % or more. Meanwhile, the rate of hydrogen addition (hydrogenation rate) is calculated from the content of the carbon-carbon double bond of the conjugated diene compound unit in the polymer block D before and after the hydrogenation from the $^1$H-NMR spectrum.

There is no particular restriction in the method for hydrogenation of the carbon-carbon double bond in the polymer block D; and therefore, a known method may be used.

Further, so far as the purpose and effects of the present invention are not impaired, usually the polymer block D may contain a structural unit derived from a polymerizable compound other than the conjugated diene compound with the amount thereof being preferably 30% by mass or less, while more preferably 10% by mass or less, each amount being on the basis of total mass of the polymer block D. Preferably, the other polymerizable compound is at least one compound selected from styrene, α-methylstyrene, vinyl naphthalene, vinyl anthracene, methyl methacrylate, methyl vinyl ether, N-vinyl carbazole, β-pinene, 8,9-p-menthene, dipentene, methylene norbornene, 2-methylene tetrahydrofuran, and the like. In the case that the polymer block D contains a structural unit derived from the polymerizable compound other than the conjugated diene compound, there is no particular restriction in the bonding form thereof; and thus, any bonding form selected from a random form, a block form, a tapered form, a tapered block form, and a combination of two or more of these forms may be allowed.

Especially, the polymer block D preferably contains: the polymer block d1 whose number average molecular weight is in the range of 1,000 to 30,000 and 1,4-bonding amount of the structural unit derived from the conjugate diene compound that constitutes the polymer block is less than 30 mol % (preferably in the range of 5 mol % to 25 mol %, while more preferably in the range of 10 mol % to 25 mol %); and the polymer block d2 whose number average molecular weight is in the range of 10,000 to 290,000 and 1,4-bonding amount of the structural unit derived from the conjugate diene compound that constitutes the polymer block is 30 mol % or more (preferably in the range of 30 mol % to 80 mol %, more preferably in the range of 40 mol % to 80 mol %, while still more preferably in the range of 50 mol % to 70 mol %).

The number average molecular weight of the polymer block d1 is more preferably in the range of 1,000 to 30,000, still more preferably in the range of 2,000 to 20,000, while particularly preferably in the range of 3,000 to 10,000. Also, the number average molecular weight of the polymer block d2 is more preferably in the range of 10,000 to 290,000, still more preferably in the range of 5,000 to 200,000, particularly preferably in the range of 10,000 to 100,000, while the most preferably in the range of 10,000 to 60,000.

(Bonding Style of the Polymer Block C with the Polymer Block D)

In the hydrogenated block copolymer (Y), so far as the polymer block C and the polymer block D are bonded, the bonding style thereof is not restricted; and thus, any bonding style selected from linear bonding, branched bonding, radial bonding, and combination of two or more of them may be allowed. Among them, the bonding style of the polymer block C with the polymer block D is preferably linear bonding, wherein illustrative example thereof includes a triblock copolymer represented by C-D-C, a tetrablock copolymer represented by C-D-C-D, a pentablock copolymer represented by C-D-C-D-C, and (C-D)nX type copolymer (X represents a coupler residue, and n represents an integer of 3 or more), provided that the polymer block C is represented by C and the polymer block D is represented by D. Among them, the triblock copolymer (C-D-C) is preferably used from viewpoints of ease of production of the hydrogenated block copolymer (Y), flexibility, abrasion resistance, and surfaced smoothness.

In the present description, if the same polymer blocks are bonded linearly via a divalent coupler or the like, the entire polymer block thus bonded is regarded as one polymer block (however, the number average molecular weights of them are obtained separately). Therefore, including the above examples, the polymer block which should be intrinsically described as Y-X-Y to be exact is represented by Y as a whole unless there is a special need to distinguish it from a single polymer block Y (here, X represents a coupler residue). In the present description, because the polymer block like this which contains the coupler residue is regarded as mentioned above, for example, a block copolymer which contains the coupler residue and should be described as C-D-X-D-C to be exact is represented by C-D-C, so that this is regarded as one example of a triblock copolymer (here, X represents a coupler residue).

In the hydrogenated block copolymer (Y), a polymer block H which includes a polymerizable compound other than the polymer block C and the polymer block D may be present so far as the purpose of the present invention is not impaired. In this case, the structure of the block copolymer may be a triblock copolymer with a type of C-D-H, a tetrablock copolymer with a type of C-D-H-C, a tetrablock copolymer with a type of C-D-C-H, and the like, wherein the polymer block H is represented by H.

The number average molecular weight (Mn) of the hydrogenated block copolymer (Y) is preferably in the range of 30,000 to 300,000, more preferably in the range of 35,000 to 180,000, still more preferably in the range of 40,000 to 150,000, particularly preferably in the range of 40,000 to 120,000, while the most preferably in the range of 60,000 to 110,000. If the number average molecular weight of the hydrogenated block copolymer (Y) is 30,000 or more, abrasion resistance and surface gloss of the thermoplastic elastomer composition of the present invention become better; on the other hand, if the number average molecular weight thereof is 300,000 or less, the hydrogenated block copolymer (Y) has sufficient mold processability.

With regard to the hydrogenated block copolymer (Y), from viewpoints of mechanical characteristics, abrasion resistance, and surface smoothness, the hydrogenated block copolymer (Y) containing at least one (C-d1-d2) structure, namely containing (1) the polymer block C and (2) the polymer block D, is preferable, wherein the polymer block C has the number average molecular weight of in the range of 1,000 to 50,000; and the polymer block D contains d1 representing the polymer block in which the number average molecular weight of in the range of 1,000 to 30,000 and the 1,4-bonding amount of the structural unit derived from the conjugate diene compound that constitutes the polymer block is less than 30 mol % and d2 representing the polymer block in which the number average molecular weight of in the range of 10,000 to 290,000 and the 1,4-bonding amount of the structural unit derived from the conjugate diene compound that constitutes the polymer block is 30 mol % or more. Meanwhile, more preferable number average molecular weights each are as described before.

The hydrogenated block copolymer (Y) may contain, in a molecular chain and/or in a molecular terminal, one, or two or more of functional group such as a carboxyl group, a hydroxyl group, an acid anhydride group, an amino group, and an epoxy group, so far as the purpose and effects of the present invention are not impaired. In addition, the hydrogenated block copolymer (Y) may be used as a mixture of the hydrogenated block copolymer (Y) containing the above-mentioned functional group and the hydrogenated block copolymer (Y) not containing the above-mentioned functional group.

(Production Method of the Thermoplastic Elastomer Composition)

The crosslinked composition (X) contained in the thermoplastic elastomer composition of the present invention is the composition which is obtained by heat treatment of a composition containing the components (I) to (V) with the respective before-mentioned amounts under a molten condition thereof so as to crosslink at least part of the polymer block A; and by adding this to the hydrogenated block copolymer (Y), the thermoplastic elastomer composition of the present invention is obtained. Namely, this is different from the thermoplastic elastomer composition that is obtained by mixing an uncrosslinked composition before the heat treatment with the hydrogenated block copolymer (Y) followed by heat treatment of the mixture under a molten condition thereof. Among the effects of the present invention, especially abrasion resistance and surface smoothness are achieved in the thermoplastic elastomer composition which is obtained by kneading the hydrogenated block copolymer (Y) with the crosslinked composition (X) obtained by heat treatment of the composition; on the other hand, in the thermoplastic elastomer composition which is obtained by containing the hydrogenated block copolymer (Y) in the uncrosslinked composition followed by melt kneading of them, the same effects in abrasion resistance and surface smoothness cannot be obtained.

Accordingly, in production of the thermoplastic elastomer composition of the present invention, the crosslinked composition (X) after prepared in the way as mentioned above is needed to be kneaded with addition of the hydrogenated block copolymer (Y). One preferable example of the production method thereof is to knead the crosslinked composition (X) with the hydrogenated block copolymer (Y) by using a melt kneading machine such as a single screw extruder, a twin screw extruder, a Banbury mixer, a heat roll, and various kneaders. In the case that the thermoplastic elastomer composition of the present invention is produced by using a single screw extruder or a twin screw extruder, one extruder may be used, or alternatively, in order to disperse respective components more effectively, the heat treatment (preferably melt kneading) may be successively carried out in stages by using two or more extruders. Generally, the resin temperature at the time of melt kneading is preferably in the range of 140° C. to 270° C., more preferably in the range of 160° C. to 240° C., while still more preferably in the range of 170° C. to 240° C.

Another preferable example of the production method of the thermoplastic elastomer composition of the present invention may be as follows: by using a melt kneading machine capable of side-feeding such as, for example, a twin screw extruder, the components (I) to (V) are charged from a hopper thereby producing the crosslinked composition (X) with melt kneading the resulting mixture at the before-mentioned heat treatment temperature in the melt kneading machine, and the hydrogenated block copolymer (Y) is charged to it from the side-feeder at a position after the crosslinked composition (X) is subjected to the heat treatment or a position further thereafter so as to conduct the melt kneading with the crosslinked composition (X).

Meanwhile, in the twin screw extruder, the ratio of the length (L) to the diameter (D), L/D, is preferably in the range of 30 to 100, more preferably in the range of 30 to 70, while still more preferably in the range of 40 to 70. In the case that the hydrogenated block copolymer (Y) is charged from the side feeder, the side-feeding is preferably made from the position about remaining ⅓ of the screw, while more preferably from the position about remaining ¼ of the screw.

The thermoplastic elastomer composition of the present invention may contain other polymer than the crosslinked composition (X) and the hydrogenated block copolymer (Y) as mentioned above so far as the effects of the present invention are not impaired. Illustrative example of the other polymer includes polyphenylene ether-based resins; polyamide-based resins such as polyamide 6, polyamide 6.6, polyamide 6.10, polyamide 11, polyamide 12, polyamide 6.12, polyhexamethylenediamine terephthalamide, polyhexamethylenediamine isophthalamide, and xylene group-containing polyamide; polyester-based resins such as polyethylene terephthalate and polybutylene terephthalate; acryl-based resins such as poly(methyl acrylate) and poly(methyl methacrylate); polyoxymethylene-based resins such as polyoxymethylene homopolymer and polyoxymethylene copolymer; styrene-based resins such as styrene homopolymer, α-methylstyrene homopolymer, acrylonitrile-styrene resin, and acrylonitrile-butadiene-styrene resin; polycarbonate resin; ethylene-propylene copolymer rubber (EPM) and ethylene-propylene-non-conjugated diene copolymer rubber (EPDM); styrene-butadiene copolymer rubber, styrene-isoprene copolymer rubber, or hydrogenated products or modified products of them; natural rubber; synthetic isoprene rubber, liquid polyisoprene rubber, or hydrogenated products or modified products of them; chloroprene rubber; acryl rubber; butyl rubber; acrylonitrile-butadiene rubber; epichlorohydrin rubber; silicone rubber; fluorine-containing rubber; chlorosulfonated polyethylene; urethane rubber; polyurethane-based elastomer; polyamide-based elastomer; styrene-based elastomer; polyester-based elastomer, and soft vinyl chloride resin. These may be used singly, or concurrently two or more of them.

Further, the thermoplastic elastomer composition of the present invention may contain inorganic filler if necessary. Illustrative example of the inorganic filler includes calcium carbonate, talc, clay, synthetic silicon, titanium oxide, carbon black, barium sulfate, mica, glass fiber, whisker, carbon fiber, magnesium carbonate, glass powder, metal powder, kaolin, graphite, molybdenum disulfide, and zinc oxide, wherein one, or two or more of them may be contained in the composition.

Further, the thermoplastic elastomer composition of the present invention may contain, if necessary, one, or two or more materials selected from flame retardant, lubricant, light stabilizer, pigment, heat stabilizer, anti-clouding agent, anti-static agent, anti-blocking agent, UV absorber, heat resistant stabilizer, antioxidant, coloring agent, and so forth. Among them, illustrative example of the antioxidant includes hindered phenol-based antioxidants, hindered amine-based antioxidants, phosphorous-based antioxidants, and sulfur-based antioxidants.

In the case that the thermoplastic elastomer composition of the present invention contains the other component than the crosslinked composition (X) and the hydrogenated block copolymer (Y), the content thereof is within a range not impairing the effects of the present invention, i.e., for example, the content thereof is preferably 50% by mass or less, more preferably 30% by mass or less, while still more preferably 10% by mass or less, each content being relative to entirety of the thermoplastic elastomer composition.

There is no particular restriction with regard to the preparation method of the thermoplastic elastomer composition containing these other component, so that the method may be any one of the following methods: (i) after the crosslinked composition (X) is prepared in the way as mentioned above, the other component is added together with the hydrogenated block copolymer (Y) followed by kneading them together; (ii) after the crosslinked composition (X) is kneaded with at least part of the other component, they are kneaded with the hydrogenated block copolymer (Y) and, if necessary, with the residual other component; (iii) after the crosslinked composition (X) and the hydrogenated block copolymer (Y) are kneaded, the other component is further added followed by kneading of the resulting mixture. Among them all, from viewpoint of simplicity, the method (1) is preferable.

By molding the thermoplastic elastomer composition obtained in the way as described above by using heretofore known methods such as, for example, extrusion molding, injection molding, press molding, and calendar molding, the molded article can be obtained. Further, by a two-color molding method, a composite with other members (for example, polymer materials such as polyethylene, polypropylene, olefin-based elastomer, ABS resin, and polyamide, as well as metal, wood, and cloth) may be produced.

In the thermoplastic elastomer composition of the present invention, the abrasion loss thereof by the DIN abrasion test falls approximately in the range of 5 mm$^3$ to 90 mm$^3$, while preferably in the range of 10 mm$^3$ to 40 mm$^3$.

The tensile strength at break thereof falls approximately in the range of 9 MPa to 20 MPa, while preferably in the range of 10 MPa to 15 MPa. The tensile elongation at break thereof falls approximately in the range of 560% to 800%, preferably in the range of 650% to 800%, while more preferably in the range of 680% to 750%.

In addition, the thermoplastic elastomer composition of the present invention is excellent in surface smoothness; and thus, the molded article is resistant in formation of a flow mark.

Meanwhile, the abrasion loss, the tensile strength at break, and the tensile elongation at break of the thermoplastic elastomer composition as described above are the values measured by the methods described in EXAMPLES.

EXAMPLES

Hereinafter, the present invention will be described in more detail by way of Examples and the like. However, the present invention is not limited to such Examples.

Furthermore, the following are used as the respective components used in Examples and Comparative Examples below.

Moreover, the number average molecular weight was determined as a value relative to polystyrene as a standard by carrying out the gel permeation chromatography (GPC) measurement under the following conditions.

(Conditions for GPC Measurement)
Column: "TSKgel G4000HXL" (trade name)×2 (manufactured by Tosoh Corporation (column temperature: 40° C.)
Mobile phase: tetrahydrofuran (flow rate: 1 mL/min)
Detector: differential refractometer (a multi-wavelength detector (detection wavelength: 254 nm) is further connected)
Standard material: TSK standard polystyrene (manufactured by Tosoh Corporation
Sample concentration: 0.06% by mass
[Production of the Block Copolymer (I)]

Production Example 1

Into an autoclave equipped with an agitating apparatus were taken 30 kg of cyclohexane, 14 mL of sec-butyl lithium (1.3 M cyclohexane solution), and 778 g of a mixture of p-methylstyrene/styrene=30/70 (mass ratio); and polymerization was carried out at 50° C. for 120 minutes. Then, into it was added 3,630 g of a mixture of isoprene/butadiene=60/40 (mass ratio); and polymerization was carried out for 120 minutes. Thereafter, into it was further added 778 g of a mixture of p-methylstyrene/styrene=30/70 (mass ratio); and after polymerization was carried out for 120 minutes, the polymerization was stopped by adding methanol to obtain a reaction mixture solution containing poly(p-methylstyrene/styrene)-poly(isoprene/butadiene)-poly(p-methylstyrene/styrene) triblock copolymer. Into the reaction mixture solution thus obtained was added a hydrogenation catalyst prepared from nickel octoate and triisopropyl aluminum; and a hydrogenation reaction was carried out at 80° C. under a hydrogen atmosphere of 1 MPa for 5 hours to obtain a hydrogenated product of the poly(p-methylstyrene/styrene)-poly(isoprene/butadiene)-poly(p-methylstyrene/styrene) triblock copolymer [hereinafter, this hydrogenated product is referred to as the block copolymer (I)]. The number average molecular weight (Mn) of the obtained block copolymer (I) was 360,000; the ratio of each polymer block was 15/70/15 (mass ratio) [polymer block A/polymer block B/polymer block A]; and the hydrogenation rate of the poly(isoprene/butadiene) block was 99 mol % from the $^1$H-NMR measurement result.

Physical properties of the block copolymer (I) obtained in Production Examples 1 are summarized in Table 1 below.

TABLE 1

| Block copolymer | | Aromatic vinyl compound unit [Polymer block A] (mass ratio) | Conjugated diene compound [Polymer block B] (mass ratio) | Ratio of polymer blocks [A/B/A] (mass ratio) | Number average molecular weight | Hydrogenation rate (mol %) |
|---|---|---|---|---|---|---|
| Production Example 1 | (I) | p-MeSt/St (30/70) | isoprene/butadiene (60/40) | 15/70/15 | 360,000 | 99 |

<Explanation of Abbreviation in Table 1>
p-MeSt/St: structural unit derived from p-methylstyrene/structural unit derived from styrene

[Olefin-Based Resin (II)]
Propylene homopolymer [trade name: "Prime Polypro E111G"; MFR: 0.5 g/10 min (230° C., 2.16 kg); melting point: 165° C.; manufactured by Prime Polymer Co., Ltd.]
[Crosslinking Agent (III)]
2,5-Dimethyl-2,5-di(t-butylperoxy)hexane [trade name: "Perhexa 25B-40"; manufactured by NOF Corp.]
[Crosslinking Adjuvant (IV)]
2-Hydroxy-3-acryloyloxypropyl methacrylate [trade name: "NK Ester 701A"; manufactured by Shin-Nakamura Chemical Co., Ltd.]
[Softener for Rubber (V)]
Paraffin-based process oil [trade name: "PW-90"; dynamic viscosity: 95.54 mm$^2$/s (40° C.); manufactured by Idemitsu Kosan Co., Ltd.]
[Production of the Hydrogenated Block Copolymer (Y1)]

Production Example 2

An autoclave equipped with an agitating apparatus was displaced with nitrogen; and into it were charged 90.9 g of α-methylstyrene, 138 g of cyclohexane, 15.2 g of methylcyclohexane, and 3.1 g of tetrahydrofuran. Into this mixed solution was added 9.4 mL of sec-butyl lithium (1.3 M cyclohexane solution); and then, polymerization was carried out at −10° C. for 3 hours. By the GPC measurement, the number average molecular weight (Mn) of the poly(α-methylstyrene) (polymer block C) after 3 hours from initiation of the polymerization was 6,600 relative to the standard polystyrene, and the polymerization conversion rate of α-methylstyrene was 89%.

Next, into this reaction mixture solution was added 23 g of butadiene; and then, after polymerization was carried out with stirring at −10° C. for 30 minutes, 930 g of cyclohexane was added to it. At this time, the polymerization conversion rate of α-methylstyrene was 89%, the number average molecular weight of the formed polybutadiene block d1 was 3,700 (relative to the standard polystyrene; measured by GPC), and the content of the 1,4-bond structure unit obtained from the $^1$H-NMR measurement was 19 mol %.

Next, into this reaction mixture solution was added 141.3 g of butadiene; and then, polymerization was carried out at 50° C. for 2 hours. The number average molecular weight (Mn) of the polybutadiene block d2 in the block copolymer (structure: C-d1-d2) of the sample obtained at this time was 29,800 (relative to the standard polystyrene; measured by GPC); and the content of the 1,4-bond structure unit obtained from the $^1$H-NMR measurement was 60 mol %.

Subsequently to this, into this polymerization reaction solution was added 12.2 mL of dichlorodimethylsilane (0.5 M toluene solution); and then, the resulting mixture was stirred at 50° C. for 1 hour to obtain poly(α-methylstyrene)-polybutadiene-poly(α-methylstyrene) triblock copolymer. The coupling efficiency at this time was 94% by mass, which was calculated from the area ratio (obtained from UV absorption in GPC) of the coupling body [poly(α-methylstyrene)-polybutadiene-poly(α-methylstyrene) triblock copolymer: C-d1-d2-X-d2-d1-C; in the formula, X represents the coupler residue (—Si(CH$_3$)$_2$—); number average molecular weight of 81,000] to the unreacted block copolymer [poly(α-methylstyrene)-polybutadiene block copolymer: C-d1-d2; number average molecular weight of 41,000]. Also, as a result of $^1$H-NMR analysis, the content of the poly(α-methylstyrene) block in the poly(α-methylstyrene)-polybutadiene-poly(α-methylstyrene) triblock copolymer was 33% by mass; and the content of the 1,4-bond structure unit in total of the polybutadiene block (polymer block D), namely in the block d1 and block d2, was 56 mol %.

Into the polymerization reaction solution thus obtained was added a Ziegler-type hydrogenation catalyst formed from nickel octoate and triethyl aluminum under a hydrogen atmosphere to carry out the hydrogenation reaction with the hydrogen pressure of 0.8 MPa at 80° C. for 5 hours to obtain the hydrogenated product of the poly(α-methylstyrene)-polybutadiene-poly(α-methylstyrene) triblock copolymer [hereinafter, this is referred to as simply the hydrogenated block copolymer (Y1)].

As a result of the GPC measurement of the hydrogenated block copolymer (Y1) thus obtained, it was found that the main component was the hydrogenated product (coupling body) of the poly(α-methylstyrene)-polybutadiene-poly(α-methylstyrene) triblock copolymer with the peak top molecular weight (Mt) of 81,000, the number average molecular weight (Mn) of 78,700, the weight average molecular weight (Mw) of 79,500, and Mw/Mn=1.01; and the content of the coupling body in it was 94% by mass from the UV-absorption area ratio (254 nm) in GPC. From the $^1$H-NMR measurement, the hydrogenation rate of the polybutadiene block (polymer block D) that is composed the block d1 and the block d2 was 99 mol %.

[Production of the Hydrogenated Block Copolymer (Y2)]

Production Example 3

Into an autoclave equipped with an agitating apparatus were added 50 kg of cyclohexane, 218 mL of sec-butyl lithium (1.3 M cyclohexane solution), and 1.5 kg of styrene; and then, polymerization was carried out at 50° C. for 120 minutes. Next, after 13.6 kg of isoprene was added to it, polymerization was carried out for 120 minutes; and then, 1.5 kg of styrene was further added to it, and polymerization was carried out for 120 minutes. The polymerization was stopped by adding methanol to obtain a reaction mixture solution containing polystyrene-polyisoprene-polystyrene triblock copolymer. Into this reaction mixture solution thus obtained was added the hydrogenation catalyst prepared from nickel octoate and triisopropyl aluminum; and then, the hydrogenation reaction was carried out at 80° C. under a hydrogen atmosphere of 1 MPa for 5 hours to obtain a hydrogenated product of the polystyrene-polyisoprene-polystyrene triblock copolymer [hereinafter, this is referred to as simply the block copolymer (Y2)].

The number average molecular weight (Mn) of the block copolymer (Y2) thus obtained was 96,000, Mw/Mn=1.01, and the ratio of each polymer block was 9/82/9 (mass ratio) [polymer block C/polymer block D/polymer block C]. As a result of the $^1$H-NMR measurement, the hydrogenation rate of the polyisoprene block was 99 mol %, and the content of the 1,4-bond structure unit was 96 mol %.

Physical properties of the hydrogenated block copolymers (Y1) and (Y2) obtained by Production Examples 2 and 3, respectively, are summarized in Table 2 below.

TABLE 2

| | Hydrogenated block copolymer | Aromatic vinyl compound unit [Polymer block C] (mass ratio) | Conjugated diene compound [Polymer block D] (mass ratio) | Ratio of polymer blocks [C/D/C] (mass ratio) | Number average molecular weight | Hydrogenation rate (mol %) | 1,4-bonding amount (mol %) |
|---|---|---|---|---|---|---|---|
| Production Example 2 | (Y1) | α-MeSt | Butadiene | 16.5/67/16.5 | 78,700 | 99 | 56 |
| 3 | (Y2) | St | Isoprene | 9/82/9 | 96,000 | 99 | 96 |

<Explanations of Abbreviation in Table 2>
α-MeSt: structural unit derived from α-methylstyrene
St: structural unit derived from styrene Reference Examples 1 to 4

After respective components shown in Table 3 below were premixed with respective blending ratios (unit: parts by mass) to obtain a mixture, the entirety of this mixture was fed to a twin screw extruder (TEX-44XCT; L/D=42; manufactured by The Japan Steel Works, Ltd.), melt kneaded at 170° C. to 200° C. and the rotation speed of 300 min$^{-1}$, and then it was hot-cut to produce respective crosslinked compositions (X1) to (X4) in the form of pellets.

(1) Measurement of Melt Flow Rate (MFR)

MFR (g/10 min) of the respective crosslinked compositions (X1) to (X4) in the form of pellets were measured by the method in conformity with JIS K7210 under the conditions of 230° C. and 10 kg of the load. The results are summarized in Table 3.

TABLE 3

| | | Reference Example | | | |
|---|---|---|---|---|---|
| | | 1 | 2 | 3 | 4 |
| Crosslinked composition | | (X1) | (X2) | (X3) | (X4) |
| (I) | Block copolymer (I) | 100 | 100 | 100 | 100 |
| (II) | Olefin-based resin (II) | 30 | 30 | 30 | 45 |
| (III) | Crosslinking agent (III) | 1 | 1 | 2 | 2 |
| (IV) | Crosslinking adjuvant (IV) | 30 | 0.5 | 13 | 30 |
| (V) | Softener for rubber (V) | 105 | 105 | 110 | 145 |
| Physical properties | (1) MFR (g/10 min) | 3.2 | 39 | 12 | 25 |

Examples 1 to 6 and Comparative Examples 1 to 3

After each of the crosslinked compositions (X1) to (X4) obtained in Reference Examples 1 to 4 was premixed with the blending ratio shown in Table 4 (unit: parts by mass), this mixture was fed together with the hydrogenated block copolymer (Y1) or (Y2) to a twin screw extruder (TEX-44XCT; L/D=42; manufactured by The Japan Steel Works, Ltd.), melt kneaded at 170° C. to 200° C. and the rotation speed of 300 min$^{-1}$, and then, it was hot-cut to produce a thermoplastic elastomer composition in the form of pellets.

By using the thermoplastic elastomer composition in the form of pellets thus obtained, physical properties thereof were measured by the methods described below. The results are summarized in Table 4.

Comparative Example 4

Except that the composition before heat treatment of the crosslinked composition (X1) was used in place of the crosslinked composition (X1), procedure of Example 1 was repeated to produce a thermoplastic elastomer composition in the form of pellets.

By using the thermoplastic elastomer composition in the form of pellets thus obtained, physical properties thereof were measured by the methods described below. The results are summarized in Table 4.

(2) Measurement of Abrasion Loss

By using the DIN abrasion testing machine (product name: "DIN Abrasion Testing Machine GT-7012-D"; manufactured by GOTECH TESTING MACHINES Inc.) in conformity with JIS K6264-2, abrasion resistance of the molded article of each of the thermoplastic elastomer compositions obtained in Examples and Comparative Examples mentioned above was studied in the way as described below.

Firstly, each of the thermoplastic elastomer compositions in the form of pellets obtained in Examples and Comparative Examples was injection molded by using the injection molding machine ("IS-55 EPN"; mold clamping pressure of 55×10³ kg; manufactured by Toshiba Machine Co., Ltd.) under the conditions of the melting temperature at 230° C. and the mold temperature at 40° C. to obtain a molded article in the form of a sheet with the size of 110 mm×110 mm×5 mm (length×width×thickness), followed by punching out to a pillar form with the diameter of 16 mm thereby obtaining the sample for abrasion testing.

In the DIN abrasion testing machine, the test is carried out as following: a drum with a diameter of 150 mm and a width of 460 mm having a #60 polishing paper rolled on the surface thereof is rotated at the rate of 0.32 m/sec, and a sample for the abrasion testing is pressed onto this polishing paper of the drum with a load of 10 N so as to be frictionally worn. Upon testing, in order to smooth the wearing surface, firstly, the sample for the abrasion testing was subjected to a preliminary friction. The preliminary friction was conducted by pressing the sample for the abrasion testing to the drum for 20 m in the atmosphere of 23° C. Then, after the sample for the abrasion testing after this preliminary friction was weighed, the main test was conducted. In the main test, the sample after the preliminary friction was pressed to the drum for 40 m, and then, the weight thereof was measured. The weight difference before and after the main test was obtained (this difference is referred to as abrasion weight). Meanwhile, in order to invalidate the effect of the wearing state of the polishing paper, the abrasion weight of a standard rubber was measured in the same procedure as the above.

Here, the abrasion volume (abrasion loss) A (mm$^3$) can be obtained from the following equation, wherein $W_1$ represents the abrasion weight of the standard rubber, $W_2$ represents the abrasion weight of the sample for the abrasion testing, and S represents the specific gravity of the sample for the abrasion testing. The abrasion resistance is higher when the value of the abrasion loss is smaller.

$$A=(W_2 \times 200)/(W_1 \times S)$$

(3) Measurements of Tensile Strength at Break and Tensile Elongation at Break

The thermoplastic elastomer composition in the form of pellets was injection molded similarly to that for the abrasion resistance evaluation to obtain a sheet; and then, a test piece having a dumbbell-5 shape in conformity with JIS K6251 was punched out from this sheet. The test piece thus obtained was subjected to the tensile test under the conditions with the temperature of 23° C., the pulling rate of 500 mm/min, and the chuck-chuck distance of 5 cm to measure the tensile strength at break (MPa) and the tensile elongation at break (%).

(4) Evaluation of Surface Smoothness

From the thermoplastic elastomer composition in the form of pellets, a sheet was prepared by the same injection molding as that used for the evaluation of abrasion resistance mentioned before; and surface smoothness was evaluated according to the following standards.

A: A flow mark can be confirmed on surface of the molded article by visual observation.

C: A flow mark cannot be confirmed on surface of the molded article by visual observation.

content of the crosslinking adjuvant (IV) being less than 1 part by mass was used, abrasion resistance decreased significantly. In Comparative Example 4 in which melt kneading was conducted on the hydrogenated block copolymer (Y1) added with the uncrosslinked composition before heat treatment of the crosslinked composition (X1) for crosslinking, not only abrasion resistance and surface smoothness were significantly decreased, but also mechanical characteristics were unsatisfactory.

INDUSTRIAL APPLICABILITY

The thermoplastic elastomer composition of the present invention, by utilizing the characteristics thereof, can be effectively used in a wide range of applications such as, for example, automobile interior and exterior parts such as instrument panels, rack-and-pinion boots, suspension boots, constant velocity joint boots, bumpers, side moldings, weather strips, mud guards, emblems, leather seats, floor mats, arm rests, air bag covers, steering wheel covers, belt line moldings, flash mounts, gears, and knobs; hoses and tubes such as pressure hoses, fire hoses, hoses for coating, washing machine hoses, fuel tubes, oil hydraulic and pneumatic tubes, and tubes for dialysis; gripping materials for various products (for example, scissors, drivers, toothbrushes, pens, and cameras); home-appliance parts such as refrigerator gaskets, vacuum cleaner bumpers, cellular phone protection films, and waterproof bodies; business machine parts such as feeding rollers and winding rollers for copy machines; furniture such as sofa and chair sheets; parts such as switch covers, casters, stoppers, and leg rubber; construction materials such as coated steel plates and coated plywood; sporting goods such as swimming goggles, snorkels, ski sticks, ski boots, snowboard boots, surface material of skiboard or snowboard, and golf ball covers; medical supplies such as syringe gaskets and rolling tubes; industrial materials such as conveyer belts, electric belts, and pelletizer rolls; stretchable members of sanitary goods such as paper diapers, poultices, and bandages; band applications such as hair bands, wrist bands, watch bands, and eyeglass bands;

TABLE 4

|  |  |  | Example |  |  |  |  |  | Comparative Example |  |  |  |
|---|---|---|---|---|---|---|---|---|---|---|---|---|
| Thermoplastic elastomer composition |  |  | 1 | 2 | 3 | 4 | 5 | 6 | 1 | 2 | 3 | 4 |
|  | Crosslinked composition (X1) |  | 50 | 70 | 40 |  |  | 50 | 100 | 95 |  |  |
|  | Crosslinked composition (X2) |  |  |  |  |  |  |  |  |  | 50 |  |
|  | Crosslinked composition (X3) |  |  |  |  | 50 |  |  |  |  |  |  |
|  | Crosslinked composition (X4) |  |  |  |  |  | 50 |  |  |  |  |  |
| Composition before heat treatment of crosslinked composition (X1) |  |  |  |  |  |  |  |  |  |  |  | 50 |
|  | Hydrogenated block copolymer (Y1) |  | 50 | 30 | 60 | 50 | 50 |  | 5 | 50 | 50 |  |
|  | Hydrogenated block copolymer (Y2) |  |  |  |  |  |  | 50 |  |  |  |  |
| Evaluation result | (2) | Abrasion loss (mm$^3$) | 14 | 12 | 36 | 60 | 80 | 55 | 6 | 8 | 148 | 148 |
|  | (3) | Tensile strength at break (MPa) | 13.8 | 14.2 | 12.6 | 9.9 | 9.7 | 12.0 | 15.0 | 14.7 | 7.8 | 7.8 |
|  |  | Tensile elongation at break (%) | 710 | 700 | 700 | 580 | 670 | 740 | 690 | 690 | 620 | 620 |
|  | (4) | Surface smoothness | A | A | A | A | A | A | C | C | A | C |

From Table 4, it can be seen that the thermoplastic elastomer composition of the present invention is excellent not only in mechanical characteristics but also in abrasion resistance and surface smoothness.

On the other hand, in Comparative Examples 1 and 2 in which the hydrogenated block copolymer (Y1) or (Y2) was not contained, or the content thereof was small, surface smoothness decreased clearly. In Comparative Example 3 in which the crosslinked composition (X2) obtained with the and other goods such as snow chains, wire coating materials, trays, films, sheets, stationery, toys, and sundry goods.

The invention claimed is:

1. A thermoplastic elastomer composition comprising:
   a crosslinked composition (X) and
   a hydrogenated block copolymer (Y),
   wherein a mass ratio (X)/(Y) ranges from 10/90 to 90/10;

wherein the crosslinked composition (X) is obtained by heating a starting composition under a molten condition of the crosslinked composition (X), the starting composition comprising:
- 100 parts by mass of at least one block copolymer (I) selected from a group consisting of a block copolymer and a hydrogenated product thereof, the said block copolymer comprising a polymer block A mainly comprising a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly comprising a structural unit derived from a conjugated diene compound;
- 10 parts by mass to 300 parts by mass of an olefin-based resin (II);
- 0.01 parts by mass to 20 parts by mass of a crosslinking agent (III);
- 1 part by mass to 50 parts by mass of a crosslinking adjuvant (IV); and
- 30 parts by mass to 250 parts by mass of a softener for rubber (V);

wherein the hydrogenated block copolymer (Y) is obtained by hydrogenating a block copolymer having at least two polymer blocks C mainly comprising a structural unit derived from an aromatic vinyl compound and at least one polymer block D mainly comprising a structural unit derived from a conjugated diene compound, provided that the block copolymer (I) is not included therein; and the thermoplastic elastomer composition is obtained by, after heating the starting composition to crosslink at least part of the polymer block A, adding the hydrogenated block copolymer (Y), and kneading the crosslinked composition (X) and the hydrogenated block copolymer (Y).

2. The thermoplastic elastomer composition according to claim 1, wherein the polymer block C included in the hydrogenated block copolymer (Y) is a polymer block mainly comprising a structural unit derived from styrene or α-methyl styrene.

3. The thermoplastic elastomer composition according to claim 1, wherein the polymer block C included in the hydrogenated block copolymer (Y) is a polymer block mainly comprising a structural unit derived from α-methyl styrene.

4. The thermoplastic elastomer composition according to claim 1, wherein number average molecular weight (Mn) of the hydrogenated block copolymer (Y) is in the range of 30,000 to 300,000.

5. The thermoplastic elastomer composition according to claim 1, wherein the hydrogenated block copolymer (Y) comprises:
(1) the polymer block C having number average molecular weight of in the range of 1,000 to 50,000 and
(2) the polymer block D having number average molecular weight of in the range of 1,000 to 30,000 and comprising a polymer block d1 having less than 30 mol % of a 1,4-bonding amount in a structural unit derived from a conjugated diene compound that constitutes the polymer block and a polymer block d2 having number average molecular weight of in the range of 10,000 to 290,000 and 30 mol % or more of a 1,4-bonding amount in a structural unit derived from a conjugated diene compound that constitutes the polymer block.

6. The thermoplastic elastomer composition according to claim 1, wherein the structural unit (a) is a structural unit derived from p-methylstyrene.

7. The thermoplastic elastomer composition according to claim 1, wherein the crosslinking agent (III) is at least one kind selected from organic peroxides.

8. The thermoplastic elastomer composition according to claim 1, wherein the crosslinking adjuvant (IV) is a compound having 2 or more functional groups belonging to at least one kind selected from a group consisting of a methacryloyl group and an acryloyl group.

9. The thermoplastic elastomer composition according to claim 1, wherein the crosslinking adjuvant (IV) comprises one methacryloyl group, one acryloyl group, and one or more hydroxyl groups.

10. A method of producing a thermoplastic elastomer composition, the method comprising:
heating a starting composition to obtain a crosslinked composition (X) under a molten condition of the crosslinked composition (X), the starting composition comprising:
- 100 parts by mass of at least one block copolymer (I) selected from a group consisting of a block copolymer and a hydrogenated product thereof, the said block copolymer comprising a polymer block A mainly comprising a structural unit derived from an aromatic vinyl compound and containing 1% by mass or more of a structural unit (a) derived from a styrene in which an alkyl group having 1 to 8 carbon atoms is bonded to a benzene ring thereof and a polymer block B mainly comprising a structural unit derived from a conjugated diene compound;
- 10 parts by mass to 300 parts by mass of an olefin-based resin (II);
- 0.01 parts by mass to 20 parts by mass of a crosslinking agent (III);
- 1 part by mass to 50 parts by mass of a crosslinking adjuvant (IV); and
- 30 parts by mass to 250 parts by mass of a softener for rubber (V);

adding a hydrogenated block copolymer (Y) to the crosslinked composition (X) after at least part of the polymer block A is crosslinked by the heating of the starting composition, the hydrogenated block copolymer (Y) having at least two polymer blocks C and at least one polymer block D, the polymer block C mainly comprising a structural unit derived from an aromatic vinyl compound, the polymer block D mainly comprising a structural unit derived from a conjugated diene compound, provided that the block copolymer (I) is not included in the hydrogenated block copolymer (Y); and kneading the crosslinked composition (X) and the hydrogenated block copolymer (Y) in a 10/90 to 90/10 mass ratio.

11. The method according to claim 10, wherein the polymer block C included in the hydrogenated block copolymer (Y) is a polymer block mainly comprising a structural unit derived from styrene or α-methylstyrene.

12. The method according to claim 10, wherein the polymer block C included in the hydrogenated block copolymer (Y) is a polymer block mainly comprising a structural unit derived from α-methylstyrene.

13. The method according to claim 10, wherein number average molecular weight (Mn) of the hydrogenated block copolymer (Y) is in the range of 30,000 to 300,000.

14. The method according to claim 10, wherein the hydrogenated block copolymer (Y) comprises:

(1) the polymer block C having number average molecular weight of in the range of 1,000 to 50,000 and
(2) the polymer block D having number average molecular weight of in the range of 1,000 to 30,000 and comprising a polymer block d1 having less than 30 mol % of a 1,4-bonding amount in a structural unit derived from a conjugated diene compound that constitutes the polymer block and a polymer block d2 having number average molecular weight of in the range of 10,000 to 290,000 and 30 mol % or more of a 1,4-bonding amount in a structural unit derived from a conjugated diene compound that constitutes the polymer block.

15. The method according to claim 10, wherein the structural unit (a) is a structural unit derived from p-methylstyrene.

16. The method according to claim 10, wherein the crosslinking agent (III) is at least one kind selected from organic peroxides.

17. The method according to claim 10, wherein the crosslinking adjuvant (IV) is a compound having 2 or more functional groups belonging to at least one kind selected from a group consisting of a methacryloyl group and an acryloyl group.

18. The method according to claim 10, wherein the crosslinking adjuvant (IV) comprises one methacryloyl group, one acryloyl group, and one or more hydroxyl groups.

* * * * *